Aug. 2, 1966 W. SEABLOM 3,263,929
SPRINKLER HEAD AND SYSTEM
Filed Oct. 28, 1964 7 Sheets-Sheet 1

INVENTOR.
WENDELL SEABLOM
BY Fleho & Swain
ATTORNEYS

Aug. 2, 1966  W. SEABLOM  3,263,929
SPRINKLER HEAD AND SYSTEM
Filed Oct. 28, 1964  7 Sheets-Sheet 2

INVENTOR.
Wendell Seablom
BY
*Fleh, O. Swain*
Attorneys

Aug. 2, 1966 W. SEABLOM 3,263,929
SPRINKLER HEAD AND SYSTEM
Filed Oct. 28, 1964 7 Sheets-Sheet 4

INVENTOR.
Wendell Seablom
BY
*Fleh, Swain*
Attorneys

INVENTOR.
Wendell Seablom
BY Flehr & Swain
Attorneys

Aug. 2, 1966     W. SEABLOM     3,263,929
SPRINKLER HEAD AND SYSTEM
Filed Oct. 28, 1964     7 Sheets-Sheet 6

INVENTOR.
Wendell (NMI) Seablom
BY
Attorneys

Aug. 2, 1966 W. SEABLOM 3,263,929
SPRINKLER HEAD AND SYSTEM
Filed Oct. 28, 1964 7 Sheets-Sheet 7

INVENTOR.
Wendell (NMI) Seablom
BY
*Flehr & Swain*
Attorneys

United States Patent Office 3,263,929
Patented August 2, 1966

3,263,929
SPRINKLER HEAD AND SYSTEM
Wendell Seablom, 3712 Texas Road, Santa Rosa, Calif.
Filed Oct. 28, 1964, Ser. No. 407,255
10 Claims. (Cl. 239—204)

The present invention is a continuation-in-part of my copending application Serial No. 376,989 filed, June 22, 1964, and now abandoned, which was a continuation-in-part of Serial No. 316,716, filed October 16, 1963, also abandoned.

This invention relates to sprinkler heads and systems of a type employing extensible heads as are particularly useful in overhead distribution of water to lawns and other crops. As will be noted below, the invention is also useful in providing an improved hydraulic lift.

In spraying water onto lawns from sprinkler heads disposed at various locations about the terrain, it is often desirable in fixed installations to have the sprinkler head mounted flush with or below the ground. This is particularly desirable, for example, when grass is to be mowed or other crops harvested. On the other hand, it is not unusual to desire the sprinkler head to discharge a stream of liquid from a position well above the ground level. For example, to minimize the pipe layout, it may be desired to locate sprinkler heads in the midst of shrubbery or other obstructions. In such a case, it can be useful to have a sprinkler head originate a stream of liquid from a raised position to discharge over the top of the shrubbery or the like. However, if the head is fixed in place, it can become an annoyance when working in and about the shrubbery.

Consequently, it is a general object of the present invention to provide an improved extensible sprinkler head.

In extensible sprinkler devices, it is desirable that the spray head cover its assigned region. In certain devices the heads become turned whereby the spray is misdirected.

Another object of the invention is the provision of an extensible sprinkler head provided with improved means for positively moving the head between advanced and retracted positions while continuously maintaining the spray head to cover an assigned region.

Frequently the region around one head will have received sufficient watering well before other regions have received enough. Another object is to provide a system wherein the heads can be selectively locked out.

In sprinkling systems of the kind described wherein the sprinkler device is adapted to be buried beneath the surface of the ground and wherein a spray element is carried on the end of an extensible member arranged to be extended above ground level during spraying, it is desirable to be able to change the spray element without need to uproot the sprinkler device. In changing threaded spray elements after long exposure, it is ordinarily necessary to apply a substantial torque to the spray element.

Accordingly, it is another object of the invention to provide an extensible sprinkler device wherein torque applied to the spray element is transmitted to the sturdier body of the device so as to minimize the possibility of damaging more fragile components thereof.

It is still a further object of the invention to provide an extensible sprinkler device wherein means are provided for positively maintaining the spray element alignment with the body of the device together with means for protecting the alignment means from receiving applied torque exerted upon the device during changing of a spray head element.

Other objects of the invention will be pointed out in the following description and claims and illustrated in the accompanying drawings which disclose, by way of example, the principle of the invention and the best mode which has been contemplated as applying that principle.

In the drawings:

FIGURE 7 is an elevation section view of the device shown in FIGURE 4 taken along the line 7—7 of FIGURE 9.

In general, a sprinkler head has been provided herein wherein an elongated cylinder carries a piston movable between advanced and retracted positions. The piston is formed with a portion disposed to be extensible with respect to one end of the cylinder. The piston and the extensible portion are formed with a flow passage to pass liquid from one side thereof to be discharged on the other from the end of the extensible portion outside the cylinder.

A valve member is carried by the cylinder and telescopically coacts with the piston in order to block the flow passage when the piston is in its retracted position and to open the flow passage when the piston is in its advanced position. The cylinder is arranged to include means serving to pass liquid under pressure into the cylinder to one side of the piston in order to move the piston to its advanced position and thereby open the flow passage. The applied liquid then passes through the flow passage and discharges out the extensible portion.

According to a particularly preferred embodiment the sprinkler device employs alignment means serving to maintain radial positioning of a fluid discharge spray element as carried at the outer end of the extensible portion of the device. The alignment means includes a tongue member fixed with respect to the extensible portion and arranged to continuously engage the elongated valve member so as to preclude rotation between the valve member and the extensible portion of the piston.

For changing spray elements and to protect the more fragile portions of the sprinkler device, detent means are further arranged so as to engage the piston in its retracted position and transfer torque from the extensible portion to the body of the sprinkler device. The detent means and alignment means are arranged with tolerances whereby the alignment tongue is protected against receipt of the applied torque. Further, the detent means serves to impart rigidity to an alignment post carried axially of the cylinder.

Figure 1:
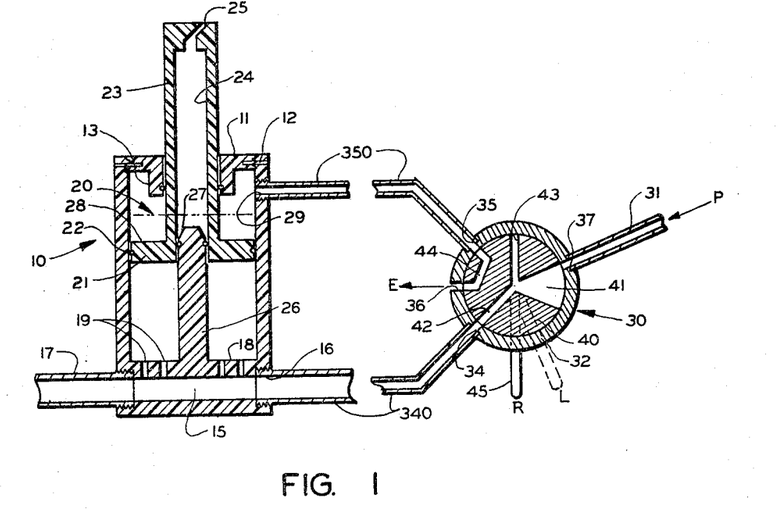
FIGURE 1 is a center line cross section view of a sprinkler head and means for controlling same in a system.

Referring to the drawings, and particularly to FIGURE 1, a hollow cylinder assembly, 10, is provided. Cylinder assembly 10 has a body portion closed at one end by a threaded cap member, 11, locked in place by a retaining pin 12 and formed with an axially extending guide sleeve, 13. The other end of the cylinder assembly includes a base portion formed to include a header portion 15, connected to receive fluid under pressure via a connection 16 and to pass fluid received to the next sprinkler head of the system via an outlet passage 17. A plurality of ports 19 are formed in the end 18 of the cylinder for admitting liquid under pressure from header 15.

A piston assembly 20 is carried within cylinder 10 and is movable between retracted and advanced positions under application of pressure via ports 19. Piston assembly 20 includes a head portion 21 carrying a sealing ring 22 around its outer edge. Head portion 21 is formed with a hole therethrough coaxially of cylinder 10. The piston assembly is further formed with a rod portion 23 carried coaxially of cylinder 10.

In order to discharge fluid from the cylinder, rod portion 23 is formed with an axial bore, 24, terminating at its upper end in a spout, 25, to provide a free discharge therefrom.

In order to control fluid flow through bore 24 the other end of bore 24 is open to receive a cylindrical valve member in the form of a plunger 26. Plunger 26 is mounted from end wall 18 and disposed to telescope into bore 24. Plunger 26 includes a free end, 27, tapered to provide a relieved portion of reduced diameter. When piston head, 21, has been moved to an advanced position as defined, for example, by abutment between sleeve portion 13 and the face 28 of head 21, a flow path will be open from header 15 via ports 19, the space around the relieved portion of end 27, bore 24, and spout 25 to permit the liquid entering under pressure through connection 16 to be discharged.

A pressure system controls the movement of piston assembly 20 to apply pressure into header 15, a valve assembly, 30, is disposed in the liquid pressure line 31. The outer housing, 32, of valve assembly 30 includes three ports, 34, 35, and 36 in addition to an inlet pressure port 37 connected to a suitable source of liquid under pressure. Port 34 is connected by a line 340 leading to connection 16. Port 35 is connected by a line 350 leading to a connection 29 in fluid communication with the interior of cylinder assembly 10. Port 36 is connected to an exhaust line (not shown) leading to low pressure.

The valve means is arranged to reverse the pressure and exhaust connections. A core 40 includes a Y shaped distribution configuration formed by channels 41, 42 and 43. Core 40 also includes an arcuate channel 44. Core 40 is arranged to be rotated, as by a lever 45, between two positions respectively raising and lowering the spout, 25, of the sprinkler head, for example, as in a lawn sprinkling application. To raise (or otherwise advance) the sprinkler head, channel 41 directs liquid under pressure from line 31 to channel 42 and port 34 into line 340 while line 350 is arranged to exhaust fluid under pressure from the other side of piston assembly 20. Line 350, and port 35 therefore are connected via channel 44 to low pressure port 36. To lower piston assembly 20 lever 45 is moved to the position designated L in order to connect line 350 to line 31 via port 37, channels 41, 43, and port 35. At this time liquid is exhausted from the opposite side of piston assembly 20 via line 340, port 34, channel 44 and port 36. Thus, the core 40, serves to interchange pressure and exhaust connections of the sprinkler head while using only four fluid connections at the valve, instead of the usual five connections found in conventional "4-way" valves.

A particularly preferred embodiment of the four-way valve construction schematically shown above is shown in FIGURES 12 through 14. The valve is arranged to provide reversible connections to pressure and exhaust lines 61, 62 respectively (shown in phantom lines in FIGURE 12). The valve construction includes means forming a body member having a hollow cylindrical interior. Thus, a cylindrical side-wall member 63 is closed at each end by end closures 64, 66. Closures 64, 66 each include a raised boss with a flat face 67, 68 respectively. End closure 66 further includes a raised boss surface 69 adapted to be sealed to a cylindrical manifold member 71. A pair of fluid ports 72, 73 extends through end closure member 66 into fluid communication with the hollow interior of manifold member 71. Manifold member 71 includes a threaded opening 74 to receive the pressure line 61. In closure member 64 there is provided a pair of fluid ports 75, 76 adapted to be fixed in alignment with ports 72, 73 respectively.

Figures 12, 13, 14:
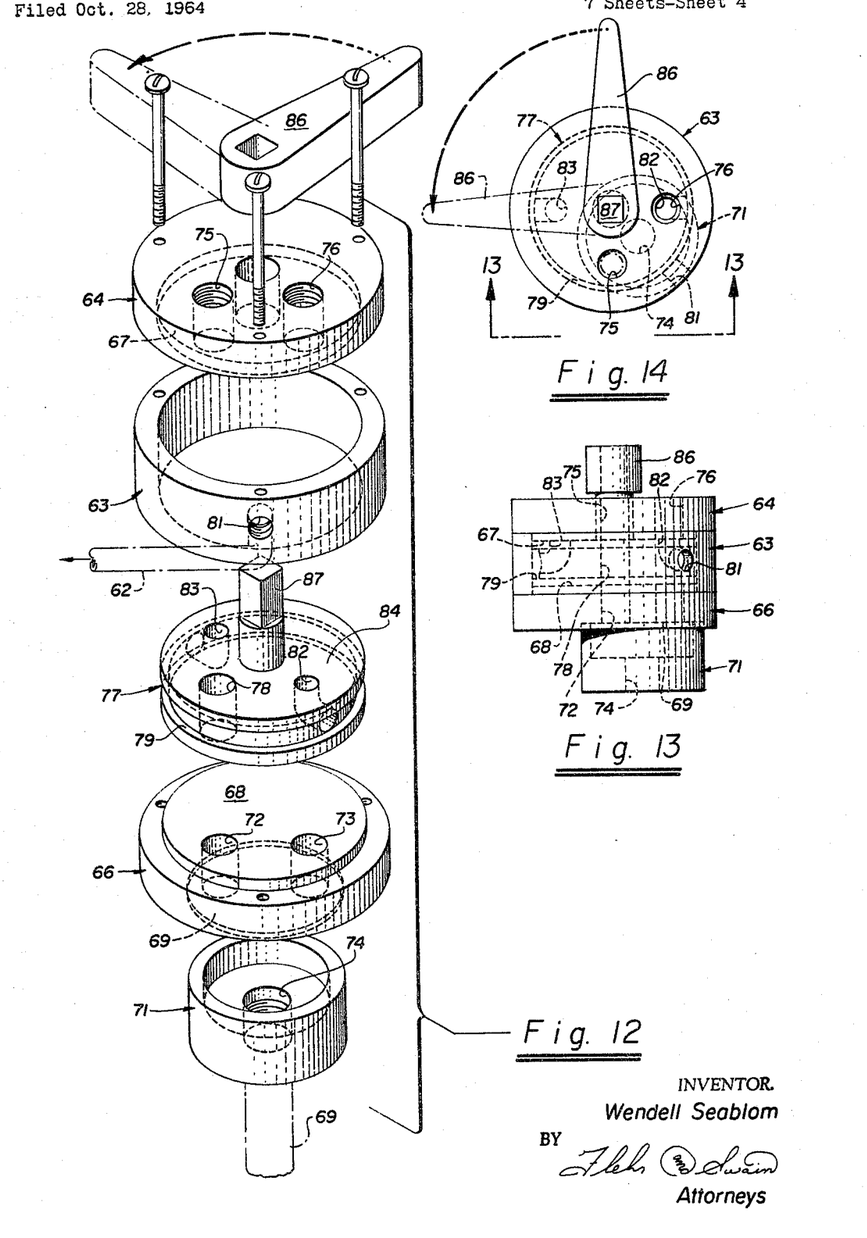
FIGURE 12 is an exploded perspective view of an improved four-way valve for the systems shown.
FIGURES 13 and 14 are respectively front elevation and plan views of the valve of FIGURE 12 shown in its assembled condition.

Thus, there is provided a pair of fluid ports extending longitudinally through each end of the body with the ports at one end being respectively aligned with the ports at the other. Ports 72, 75 form a first pair of aligned ports and ports 73, 76 form a second pair of aligned ports. The aligned ports serve to pass fluid under pressure through the valve body under control of a cylindrical core member 77.

Core member 77 is disposed coaxially of the interior of the body and is rotatable between first and second angular positions. In the first position of rotation a fluid opening 78 drilled through core member 77 serves to direct fluid under pressure from manifold member 71 to port 75 and when rotated to the other position opening 78 serves to couple port 76 to manifold member 71 via port 73. In short, opening 78 is radially displaced from the axis of the core member so as to be movable into axial alignment with either one or the other of the two pairs of longitudinally aligned ports.

Means are provided for exhausting fluid under pressure in each of the foregoing two positions. Thus, an annular manifold or header groove 79 is formed around the periphery of core member 77. An exhaust connection 81 is disposed in fluid communication with the groove for passing fluid out of the valve body. Connection 81 is drilled through the side-wall member 63. A pair of L-shaped exhaust passages 82, 83 are formed to lead from a common face 84 of core member 77 into annular groove 79. Exhaust passages 82, 83 are radially displaced from the axis of core member 77 so as to be movable into axial alignment respectively with an associated one of ports 75, 76. The exhaust passages 82, 83 are further angularly displaced from each other and from the fluid opening 78 so as to selectively register one exhaust passage with its associated port, for example passage 82 with port 76 while fluid opening 78 registers with a first of that pair of ports comprised of ports 75, 76. In the alternative the other exhaust passage 83 is arranged to register with its associated port, 75, while opening 78 registers with the other port, namely 76.

Means manually positionable, such as handle 86 is carried upon a square portion of shaft 87 so as to move core member 77 between first and second positions thereby applying pressure to one or the other of ports 75, 76 while exhausting fluid through the other.

The angular displacement of exhaust passages 82, 83 is such as to permit core member 77 to block the flow of fluid under pressure through the valve body and also to block fluid flow via the exhaust connection, whenever opening 78 is positioned on a radius located substantially midway between the radii of ports 75, 76. Thus, the four-way valve shown includes a "closed center" position whereby positioning of the sprinkler piston can be retained, if desired and the flow of water terminated.

From the foregoing description of the valve assembly of FIGURE 12 it will be readily apparent that a construction of the kind described can be easily constructed virtually entirely from cylindrical parts. Special machining will be at a minimum and labor costs reduced commensurately.

O-rings not shown, are suggested to be provided in the face 68 of end closure 66 around each of ports 72, 73 so as to provide a sealed closure with respect to the lower face of core member 77 when ports 72, 73 are not aligned with opening 78. O-rings are also suggested to be provided around exhaust passages 82, 83 in face 84 of core member 77 to provide a similar sealing function as respects the face 67 of end closure 64.

From the foregoing it will be evident that, in operation, pressure is applied to piston assembly 20 to raise it to an advanced position and thereafter the liquid which serves to raise the piston is discharged from the spout in a free discharge. It will also be evident that the heighth to which the sprinkler head can be advanced can be considerable inasmuch as it is positively returned to a retracted position by hydraulic pressure.

Thus, the sprinkler head arrangement includes a piston formed with a flow passage to pass liquid from one side thereof to be discharged on the other through the extensible portion.

Where a sprinkling system includes a number of heads arranged "in series" with water passing through each to the next, the flow area transversely of the header 15 is preferably at least as great as the inside dimension of connections 16, 17 so as not to drop the pressure in the header.

Where a system is arranged with the heads "in parallel" to pass water to a number of heads each having a separate line connecting to a common header, outlet connection 17 can be capped off or eliminated.

The positive-action retraction movement, provided hydraulically, is preferred since it permits a considerable displacement to be achieved as well as insuring quick and definite movement of the head. Further, the water supply does not have to work against system pressure during discharge. However, in other embodiments the retraction movement can be provided by capping off outlet 29 (not shown) and permitting air entrapped between the end 11 and face 28 to become compressed and thereby form a resilient means urging the piston toward a retracted position. Other resilient means such as a coil spring (not shown) can be included to supplement the compressed air or to act along. In the latter event a liquid bleed hole can be provided in end 11. The bleed hole will permit drainage from the cylinder to remove any accumulation of liquid which might otherwise prevent the piston from being able to be moved to its advanced (open) position.

Figure 3:
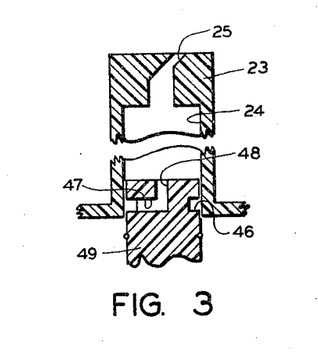
FIGURE 3 is a partial view showing still another embodiment of a sprinkler head.
Figures 4, 5, 6:
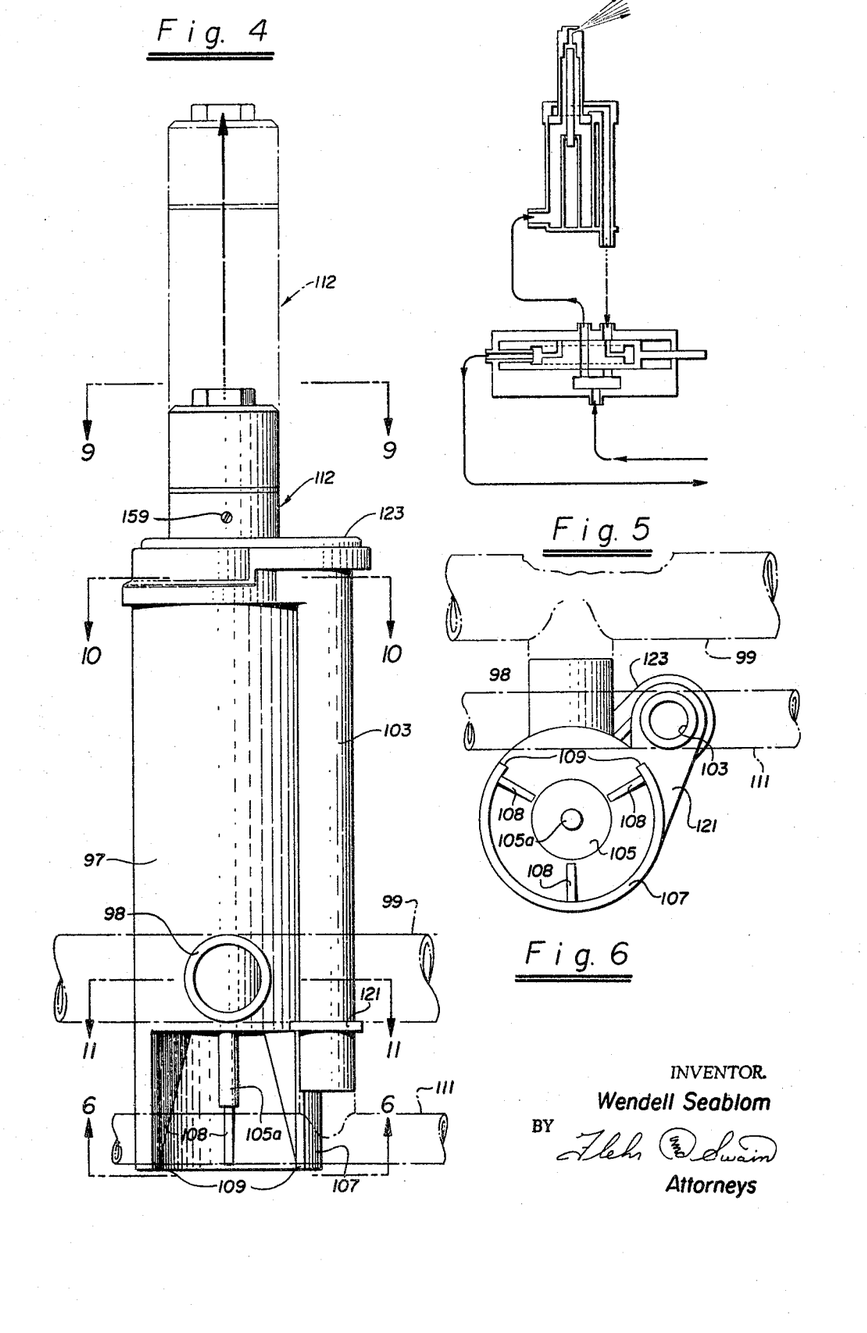
FIGURE 4 is a front elevation view of a sprinkler device according to the present invention.
FIGURE 5 shows a system employing a sprinkler device of FIGURE 4, with valve control means schematically shown.
FIGURE 6 is a bottom view of FIGURE 4.

Another embodiment of the invention is shown in FIGURE 3 wherein the relieved portion of the valve member is in the form of an annular groove 46 around valve member 49 to form a manifold for a radial hole 47 leading to an axial passage 48.

Figure 2:
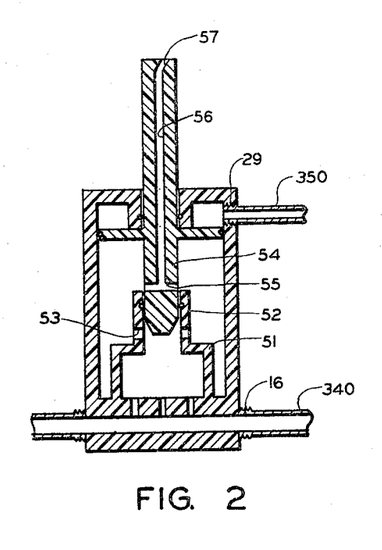
FIGURE 2 is a center line cross section of another embodiment of the invention.

Still another embodiment of the invention is shown in FIGURE 2 wherein the valve member carried by the cylinder takes the form of a cylindrically shaped member 51 including a sleeve portion 52 formed with radial openings 53 disposed to be exposed only when the piston member 54 has been moved to its advanced position. A flow passage 55, 56 is formed in piston 54 to pass liquid from one side of the piston to the other and discharge same through a spout 57 at the upper end thereof.

Referring to FIGURES 4 through 11 there is shown an embodiment particularly suitable for manufacture by injection molding techniques and incorporating features and advantages as now to be described. A body shell construction generally designated 95 having means for passing fluid into and out of a cylinder 96 is assembled from a number of injection molded parts. Thus a cylindrical body member 97 is formed to provide the cylinder 96. A fluid passage 98 is provided at the bottom of the hollow body member 97 for passing fluid into and out of cylinder 96. Water under pressure for spray distribution will normally enter passage 98 from a water pipe such as indicated at 99. Another fluid passage 101 is formed at the upper end of cylinder 96 from an assemblage of parts to be described further below whereby further transverse forming operations are not required.

Figures 7, 8, 9, 10, 11:
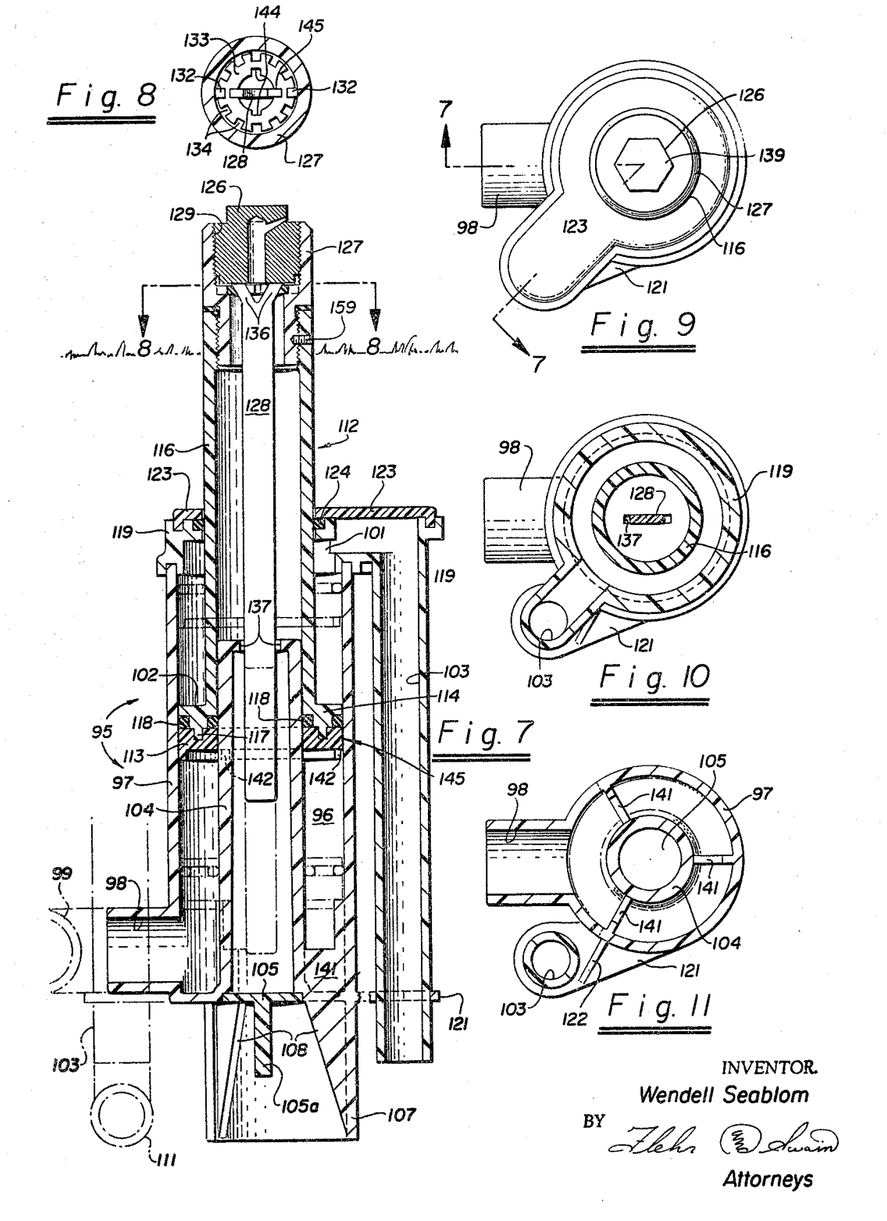
FIGURE 7 as shown has been developed by unrolling the angle formed by the line 7—7 for clarity of illustration. Lines illustrating the location of transverse sections taken at various locations in the device of FIGURE 4 to identify subsequent figures are located on FIGURE 4 but for convenience have also been added to the developed view in FIGURE 7 at corresponding locations.
FIGURE 8 is a plan view in section taken along the line 8—8 of FIGURE 4.
FIGURE 9 is a plan view in section taken along the line 9—9 of FIGURE 4.
FIGURES 10 and 11 are plan views in section taken along the lines 10—10 and 11—11 respectively of FIGURE 4.

Passage 101 discharges fluid ahead of a piston 102 as it moves upwardly within cylinder 96. Fluid discharging via passage 101 is directed downwardly along the outside of body member 97 via downspout 103 which stands free of the side wall of body member 97. It has been found desirable not to mold the tube 103 integrally with body member 97. When tube 103 is molded as an integral portion of body member 97 the differential in the mass of material on opposite sides of body member 97 causes the cylinder 96 to take a slightly deformed transverse cross section thereby making it difficult to fit cylinder 96 with a slidable piston.

A hollow cylindrical post 104 is formed in a counter bored fashion coaxially within cylinder 96. The lower end of post 104 is sealed closed by a plug 105 bonded to cover the open lower end. Plug 105 includes a stem 105a which serves as a handle when inserting plug 105.

The lower end of body member 97 is formed with anchoring means serving to stabilize the sprinkler when buried. The anchoring means comprises a skirt 107 of generally cylindrical construction bonded or otherwise fixed to the body member 97 to depend therefrom as an extension. A plurality of fixed vanes 108 are provided, lying transversely of skirt 107 and bonded both to the bottom of body member 97 and to skirt 107 so as to brace the skirt as well as to resist rotation of body member 97 when lodged in the ground. Skirt 107 is formed to include a relieved portion 109 (FIGURE 6) which serves to accommodate a transversely extending pipe 111 adapted to be coupled, as by a suitable tree or elbow connection to the downspout 103. In FIGURE 7 downspout 103 is shown in phantom lines in its true position with respect to fluid passage 98, while being shown in full lines in the "developed" view shown.

In this arrangement it will be readily appreciated that lines 99 and 111 lie in closely spaced vertical planes so as to be accommodated in a very narrow slit trench and thereby minimize the degree of disruption to an established lawn when being installed.

A piston assembly 112 includes a piston head portion 102 formed of an annular member 113 bonded to a generally flanged end 114 formed on the lower end of an elongated hollow piston extension 116. Flanged portion 114 includes an annular rib 117 inserted and bonded into a circular groove formed in the upper surface of member 113. In this manner a pair of O-rings 118 can be captured around the inner and outer circumference of the piston head 102. Members 113 and 114 then are bonded together in a conventional manner by bonding cement.

As previously mentioned, at the upper end of cylinder 96 a fluid passage 101 serves to pass fluid into and out of cylinder 96. The upper end of cylinder 96 is otherwise closed by a transversely extending molded end portion 119 formed at the upper end of downspout 103. The lower end of downspout 103 is braced by being passed through a rigid guide 121 shown best in FIGURE 11. Guide 121 is formed to extend from the exterior surface of body member 97 and includes a brace 122 to add rigidity thereto.

A cap 123 cooperates with a groove formed in the upper edge of member 119 so as to capture an O-ring 124 therebetween. O-ring 124 serves to form a seal around piston extension 116 during its movement between retracted and advanced positions.

At the upper end of piston extension 116 a spray element or other fluid discharge means 126 threadedly engages a spray head adapter 127 which is threaded into extension 116. Therefore, various types of spray elements can be employed with the same basic elevator device.

Alignment means serve to maintain radial positioning of the spray element 126 with respect to body member 97. Thus, a tongue 128 is fixed with respect to extension 116. More particularly, adapter 127 is formed with a counter bored recess 129 receiving spray element. Recess 129 is formed at its lower end with an annular shoulder 131. A pair of registration detents 132 (FIGURE 8) are formed to extend radially inwardly of recess 129 at shoulder 131. An annular washer-like key member 133, having a series of notches 134 formed in the outer periphery of same, engages registration detents 132 when disposed on shoulder 131. Key member 133 is formed so as to pass tongue member 128 through a central opening thereof until engaged at its upper end by the diverging bifurcated fingers 136 which ultimately seat into coacting notches formed in member 133.

Thus, the upper end of tongue 128 is readily releasably engaged in a locking relation with respect to key member 133 and key member 133 is in turn engaged by detents 132 so as to radially fix tongue member 128 with respect to extensible hollow piston portion 116. Spray element 126 axially retains tongue 128 within extension 116. The upper tips of fingers 136 extend very slightly above the upper surface of key member 133 so as to be engageable should it be desired to withdraw tongue 128.

The lower end of tongue 128 is slidably engaged through a slot 137 formed through the upper end of post 104. The length of tongue 128 is such that piston head 102 abuts the upper end of cylinder 96 before the lower end of tongue 128 passes out of slot 137.

As thus arranged it will be clear that tongue 128 serves to maintain radial alignment of extension 116 during movement between retracted and projected positions without interfering with the operation thereof. Extension 116 therefore will not be rotated to cause the orientation of spray element 126 to be misdirected with respect to its assigned region of coverage.

Frequently, it is desired to change spray elements 126. For this purpose a hexagonal nut 139 or the like is formed at the upper end thereof. When a wrench is applied to nut 139 a considerable torque can be developed upon the piston extension 116 which, if not dissipated through the body of the apparatus can serve to rupture or otherwise damage the device, such as by twisting tongue 128.

At the lower end of body member 97, detent means are provided within cylinder 96 so as to engage the piston in its retracted position. When so engaged the piston is precluded from rotating within cylinder 96 and torque applied to spray element 126 is transferred to body member 97 without damage to alignment tongue 128.

Therefore, at the bottom of cylinder 96 a plurality of L-shaped vanes 141 extend axially along the wall of cylinder 96. The upper ends of vanes 141 are formed and disposed to coact and be engaged in notches 142 formed in the bottom skirt 145 of piston member 113. Vanes 141 are formed integrally with the bottom end of body member 97 and impart substantial rigidity to the lower end of post 104 and the outer wall of cylinder 96.

When piston 102 is moved to its retracted position torque applied to nut 139 is transferred via notches 142 and vanes 141 to the outer wall of the body construction.

Assembly of the sprinkling device shown in FIGURE 7 is readily accomplished. O-rings 118 are disposed in their annular grooves in piston head 102. Member 113 is then bonded to the rib of member 114 by suitable bonding cement. Piston extension 116 can then be used to drop the piston head over post 104.

In this position rim member 119 is passed over extension 116 and bonded to the upper end of body member 97 with downspout 103 passing downwardly through guide 121. An O-ring 124 is passed over the end of extension 116 and cap member 123 then bonded into its coacting groove in the top of member 119 thereby capturing O-ring 124 in position to form a proper seal about extension 116.

Extension 116 then receives the spray head adapter sleeve 127 screwed into the outer end thereof. This is readily accomplished by dropping key member 133 onto shoulder 131 so that notches 114 can receive a screwdriver blade to quickly insert the adapter.

The piston assembly is then moved to its retracted position and rotated until notches 142 engage the detents formed by the upper ends of vanes 141. In this alignment, key member 133 is removed and rotated so as to orient the tongue receiving notches 145 of key member 133 with the tongue slot 137 in the upper end of post 104. Tongue 128 is then dropped downwardly through key member 133 and slot 137 so as to rotationally lock extension 116 with respect to post 104. In this condition a spray element 126 is then screwed into the upper end of extension 116 by means of nut 139 and disposed so that the spray therefrom covers its properly assigned region.

The clearance or tolerance of the engagement between tongue member 128 and slot 137 is greater than the tolerance of the engagement between notches 142 and their respective detent vanes 141. Thus, the tongue member is protected against receipt of applied torque when screwing or unscrewing spray element 126. A locking pin 159 engages adapter 127 and extension 116 to prevent adapter 127 from unscrewing in favor of spray element 126.

Figure 22:
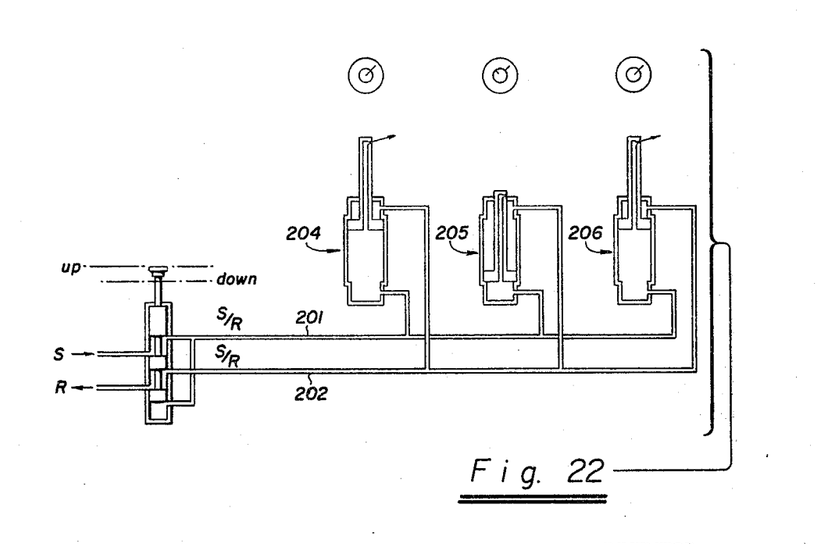
FIGURE 22 is a schematic diagram of a sprinkler system according to the invention.

Referring to FIGURE 22 a very desirable sprinkling system is provided wherein one or more of the heads can be selectively locked out at the head so as to limit further discharge of water at its assigned region. In general the system is adapted to discharge water under pressure from a source, S. The system generally includes a first fluid pressure line 201, a second fluid pressure line 202 with valve means such as the four-way valve 203 settable to each of two states of operation wherein in one state the valve means 203 is coupled to both lines 201, 202 so as to constitute one of the lines, a fluid supply line and the other a fluid return line. In the other state of its operation, valve means 203 serves to reverse the connections. A plurality of sprinkler head assemblies schematically shown as 204, 205, and 206 are each fluid coupled to lines 201, 202 so as to be movable by fluid pressure between a fluid obstructing condition as shown by the head assembly 205 and a fluid discharging condition as with head assemblies 204 and 206 whereby in one of the states of valve means 203 the heads will discharge water and in the other state they are positioned by fluid pressure to an inactive position which serves to block fluid discharge, as with head assembly 205. In the system shown in FIGURE 22 the sprinkler head assemblies include means serving to individually and selectively restrain any one of the heads to retain them in their inactive position as shown with head assembly 205. In this manner the head assemblies may be selectively and individually locked so as to preclude the discharge of water therefrom.

As now to be explained, it will be apparent that the head assemblies are locked out in a manner which leaves the sprinkling capability of the remainder of the system intact. No additional valve means is required since the lock out function is effected merely by rotating the extensible piston assembly with respect to the body shell of the head. As will be described in detail below a preferred embodiment is arranged whereby the tongue 128 is coupled to the hollow cylindrical post 104 by rotation of the elongated hollow piston extension 116 relative to post 104 when the piston assembly is in its retracted position.

Figure 17:
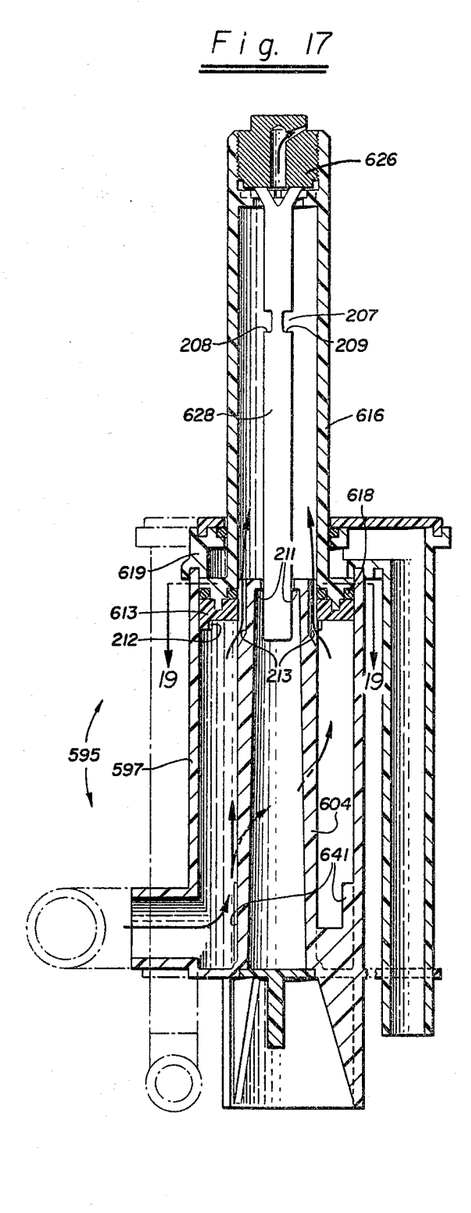
FIGURE 17 shows another embodiment of the sprinkler head in a view corresponding to FIGURE 7.

A number of the component parts of the last named embodiment are similar to comparable parts of the embodiment shown in FIGURES 4 through 11. For convenience in providing equivalent reference numerals in the embodiment now to be described (shown in FIGURES 17 through 21) the third order digit of the reference numbers in FIGURES 17 through 21 will be greater by addition of the numeral 5. Thus reference numeral 95 refers to the body shell construction generally of the sprinkler head assembly. In FIGURE 17 the comparable body shell construction in general is identified by reference numeral 595. On the other hand the L-shaped vanes 141 in FIGURE 7 are identified by reference numeral 641 in FIGURE 17.

In the embodiment now to be described and as shown in FIGURES 17 through 21 a sprinkler head assembly is provided including means for individually and selectively restraining any one of the extensible riser columns 616 to retain the spray element 626 in its retracted position thereby precluding the discharge of water from the selected head assembly so conditioned.

As will be recalled post 104 formed an elongate valve member which cooperates with the flow passage including the hollow extension 116. Thus slot 637 formed in the upper end of post 604 serves to guide the key or tongue member 628 by slidable engagement therebetween.

If it were not for the constricting nature of slot 637 in post 604, tongue 628 would be permitted to be rotated with respect to post 604 due to the enlarged hollow interior dimension of post 604. Thus it will be apparent that slot 637 forms a constriction in the hollow interior of post 604 which precludes rotation thereof during projection and retraction of the piston assembly.

Tongue 628 is formed, however, with a relieved portion disposed to register adjacent the slot 637 when the riser column 616 is in its retracted position. The relieved portion more particularly is shown as the necked down region 207 which is formed to include a transversely extending ledge 208, 209 on opposite sides of tongue 628. The relieved portion 207 is dimensioned so as to clear the constriction formed by slots 637 and permit rotation between tongue 628 and post 604 so as to dispose the ledges 208, 209 beneath the overhanging lip 211 of the constricting slot 637.

As will be recalled in the previous embodiment the bottom of the piston assembly was formed with detent means whereby vanes 141 engaged notches 142 so that when changing the spray elements, any torque applied to the riser column would be transmitted to the body construction of the sprinkler assembly. In the embodiment shown in FIGURE 17 means are provided whereby torque applied to the riser column 616 is transmitted to the body construction 595 via vanes 641.

Thus when riser column 616 is in its retracted position the necked down region 207 serves to permit the piston assembly to be rotated within the cylinder 597. Beneath the piston head, annular member 613 is formed with three downwardly extending abutments 212, best shown in FIGURE 20. Each abutment 212, when said riser column 616 is in its retracted position, extends downwardly sufficiently to engage the upper end of vanes 641 whereby rotation of the abutments 212 with respect to the vanes 641 will ultimately be limited by engagement therebetween. Accordingly the abutment means serves to transfer torque applied to the riser column 616 into the body construction of the head assembly.

From the foregoing it will be readily apparent that the constriction provided by slot 637 serves to guide the tongue 628 while the overhanging lip 211 forms a first lock means adapted to engage a second lock means in the form of the necked down portion 207 provided with the ledges 208, 209.

Figure 18:
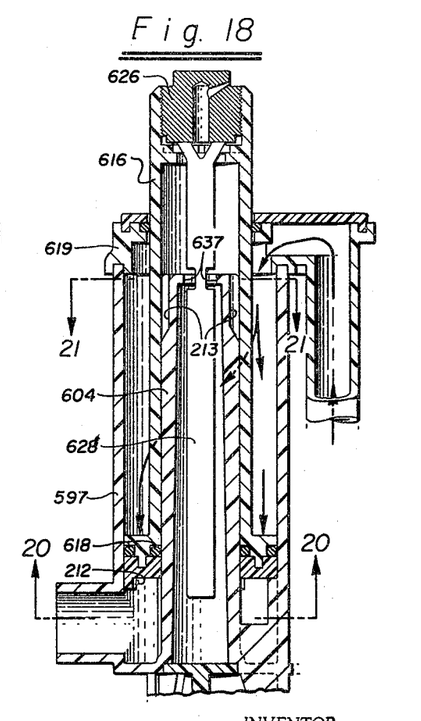
FIGURE 18 shows the sprinkler head assembly of FIGURE 17 in retracted position.
Figure 19:
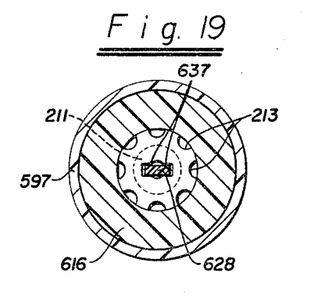
FIGURES 19, 20 and 21 are transverse sections of FIGURE 18 along the lines 19—19, 20—20, 21—21 respectively.
Figure 20:
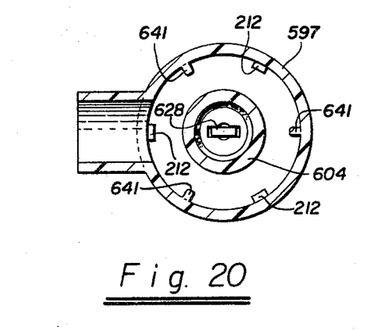
Figure 21:
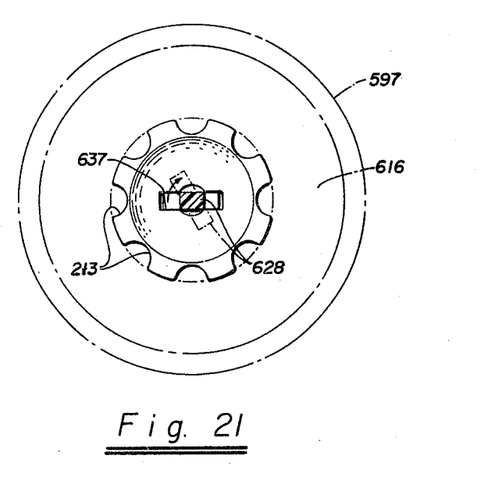

With further reference to the embodiment shown in FIGURES 17 and 18 the upper end of post 604 includes a plurality of grooves 213 extending along the outer surface of post 604 which will be recalled functions as a valve member. The grooves are disposed to be encircled by a sealing ring such as the O-ring 618 at a position intermediate the ends of the grooves 213 when the piston is in its advanced position. In this manner fluid can pass from cylinder 597 into the hollow interior of riser column 616 to be discharged via the fluid discharge element 626. The arrangement has the advantage that the sealing ring 618 is always maintained in place by the exterior surface of post 604. It will be further noted that the upward travel of the piston is limited by the cap member 619 so as to define the advanced position of the piston assembly at a point which is reached prior to carrying the sealing ring 618 upwardly beyond the end of the post 604.

Figure 15:
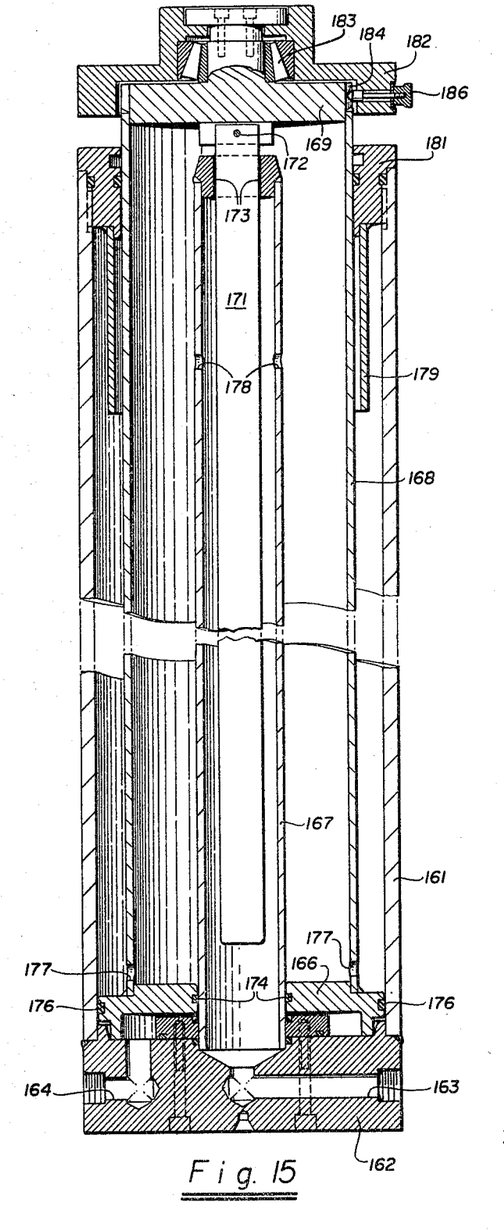
FIGURE 15 is a center line section view of hydraulic lift apparatus according to another embodiment of the invention.
Figure 16:
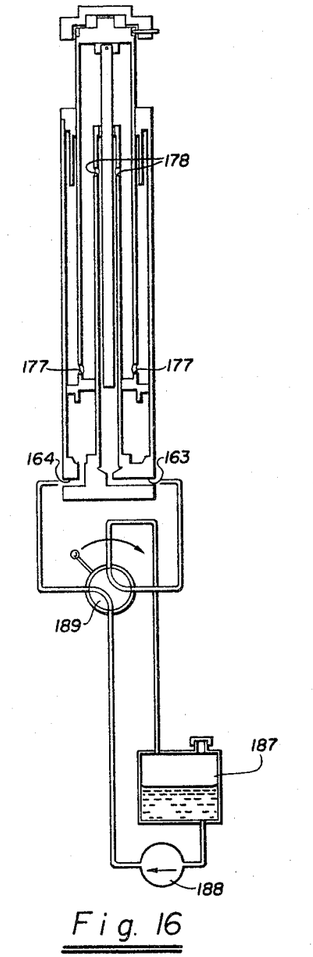
FIGURE 16 schematically shows the lift of FIGURE 15 incorporated into a system for operation therein.

The foregoing construction is useful in providing an improved hydraulic lift, as shown for example in FIGURES 15 and 16.

An extensible piston and cylinder arrangement is provided whereby a hollow cylinder body 161 is closed at its lower end by an end closure base 162. Fluid ports 163 and 164 provide fluid communication to operate piston 166.

Piston 166 rides along a hollow post 167 disposed coaxially of cylinder body 161. Piston 166 supports a cylindrical piston extension 168 which moves in and out of cylinder 161. The upper end of extension 168 is closed by an end closure member 169. Depending downwardly from closure member 169 is an elongated tongue 171 swung from a pivot pin 172 so as to be freely guided within a slot 173 formed through the upper end of post 167. The inner and outer circumference of piston 166 is provided with sealing rings 174, 176 whereby when fluid under pressure enters port 164, piston 166 is moved upwardly within cylinder 161.

Means for exhausting fluid ahead of piston 166 includes a pair of radially bored ports 177 at the lower end of extension 168 and another pair of ports 178 formed in the upper end of post 167. Thus, as piston 166 moves upwardly in cylinder 161 fluid ahead of the piston is forced through ports 177, 178 and out the bottom of post 167 via port 163. Tongue 171 serves to maintain rotational alignment of extension 168 during movement between retracted and advanced positions thereof.

Limiting stops in the form of a cylindrical sleeve 179 at the upper end of cylinder 161 abuts the upper face of piston 166 so as to limit upward travel thereof. Sleeve 179 is secured to the underside of a top closure member 181 which serves to close off the upper end of cylinder 161. Suitable O-ring seals are provided around extension 168.

At the upper end of extension 168 means are provided for rotatably supporting a load. The support means is arranged to be rotated to a selected fixed position and retained thereat.

Accordingly, a support member 182 is carried coaxially upon closure member 169 and supported for rotation upon truncated conical bearings 183. A number of teeth 184 are formed around the outer periphery of closure member 169 and arranged to cooperate with a detent pawl 186 spring loaded normally into engagement with teeth 184 so as to index the rotational position of support member 182 rotationally with respect to extension 168. Thus, the apparatus shown in FIGURE 15 is adapted to be employed as a hydraulic lift, in a system, for example, as shown in FIGURE 16.

A reservoir 187 and pump 188 are coupled to four way valve 189. In the condition shown, valve 189 is arranged to apply pressure to port 164 and thereby drive piston 166 upwardly. During upward movement the fluid ahead of piston 166 exhausts via ports 177, 178 and 163. Upon reaching the limiting stops 179, further upward movement is arrested.

During the upward travel of extension 168, rotational alignment is maintained by means of tongue 171. Upon being raised to its desired extent, support member 182 can be rotated to a desired radius by releasing pawl 186 and rotating the support member 182 as desired. Then pawl 186 is reinserted into teeth 184.

In order to drive piston 166 downwardly, valve 189 is reversed to reverse the fluid connections to cylinder 161. In this condition fluid pressure is applied to the top surface of piston 166 through ports 163, 178, 177. Fluid is exhausted via connection 164 as piston 166 descends.

I claim:

1. A sprinkler head comprising means forming a body including an elongate cylinder, a piston within the cylinder movable between retracted and advanced positions, said piston including a hollow portion disposed to be extensible from one end of the cylinder, fluid discharge means carried at the outer end of said extensible portion, said piston being formed with a flow passage to pass liquid from one side thereof to be discharged on the other via said fluid discharge means when said piston is in said advanced position, an elongate valve member carried by said cylinder and telescopically coacting with said piston to block said flow passage when said piston is in said retracted position and to open said flow passage when said piston is in said advanced position, alignment means serving to maintain radial positioning of said fluid discharge means with respect to said body, said alignment means comprising a tongue member fixed with respect to said extensible portion and continuously engaged by said elongated valve member to preclude rotation between said valve member and said extensible portion, and detent means disposed within said cylinder to engage said piston in its retracted position and preclude rotation thereof with respect to said cylinder to transfer applied torque from said extensible portion to said body, the tolerance of the engagement between said tongue member and said extensible portion being greater than the tolerance of the engagement between said detent means and said piston so as to protect said tongue member against receipt of said applied torque, and fluid passage means for passing liquid into and out of said cylinder at opposite ends thereof to move said piston between said retracted and advanced positions to open said flow passage and discharge said liquid therethrough and out said fluid discharge means.

2. Apparatus according to claim 1 further including, at the outer end of said extensible member a counter bored recess coaxially of said member, an annular shoulder formed at the inner end of the recess, registration detent means extending radially inwardly of said recess at said shoulder, an annular washer-like key member having a series of notches formed in the outer periphery thereof to engage said registration detent means, said key member being formed to pass said tongue member therethrough and engage the outer end of said tongue member in locking relation to radially fix said tongue member with respect to said extensible portion, and a spray element, forming said fluid discharge means, engaged in said recess to axially retain said tongue within said extensible member.

3. A sprinkling head according to claim 1 wherein the lower end of said body member is formed with anchoring means serving to stabilize said head in the ground, said anchoring means comprising a skirt fixed to said body member, and fixed vane-like members lying transversely of said skirt to brace same and resist rotation of said body member when disposed in the ground.

4. A sprinkling head according to claim 3 wherein said skirt depends downwardly from the bottom of said body member and is formed to include a relieved portion serving to accommodate a transversely extending pipe adapted to be coupled to said fluid passage means.

5. A sprinkler head assembly comprising a body shell, a piston within the shell movable between retracted and projected positions, a spout element carried by said piston to discharge water exteriorly of said shell, a flow passage formed to pass fluids from one side of said piston to be discharged on the other side of said piston outside of the shell via said spout element, valve means cooperating with said piston to block said flow passage when said piston is in the retracted position thereof, and further serving to open the flow passage when said piston is in the projected position thereof, an opening formed through the body shell to pass fluid under pressure to move the piston to said projected position to open said flow passage and discharge the fluid via said spout element, and first lock means fixed with respect to said body shell and second lock means fixed with respect to said piston, said lock means being movable with respect to each other between engaged and disengaged cooperation for retaining said piston in the retracted position thereof when engaged and for releasing said piston when disengaged.

6. A sprinkler head assembly comprising a body shell, a piston within the shell movable between retracted and projected positions, a spout element carried by said piston to discharge water exteriorly of said shell, a flow passage formed to pass fluid from one side of said piston to be discharged on the other side of said piston outside of the shell via said spout element, hollow valve means fixed with respect to said shell and cooperatnig with said piston to block said flow passage when said piston is in the retracted position thereof, and further serving to open the flow passage when said piston is in the projected position thereof, a guideway formed through the top of said hollow valve means, a key member fixed with respect to said spout element and depending downwardly therefrom into slidable engagement with said guideway, said key member being slidably engaged in said guideway when said spout element is moving between retracted and projected positions thereof to preclude rotation of the spout element with respect to said body shell, an opening formed through the body shell to pass fluid under pressure to move the piston to said projected position to open said flow passage and discharge the fluid via said spout element, and first lock means fixed with respect to said body shell and second lock means fixed with respect to said piston, said lock means being movable with respect to each other between engaged and disengaged cooperation for retaining said piston in the retracted position thereof when engaged and for releasing said piston when disengaged.

7. A sprinkler head assembly according to claim 6 wherein one of said lock means includes said guideway and the other lock means is fixed with respect to said key member, said first and second lock means being adjacent at a predetermined point in the axial positioning of said spout element, said first and second lock means being formed to be mutually engaged by rotation therebetween applied when in said adjacent disposition.

8. A sprinkler head comprising means forming a body construction including an elongate cylinder, a piston within the cylinder movable between retracted and advanced positions, said piston including a hollow riser portion disposed to be extensible from one end of the cylinder, fluid discharge means carried at the outer end of said riser portion, said piston being formed with a flow passage to pass liquid from one side thereof to be discharged on the other via said fluid discharge means when said piston is in said advanced position, an elongate valve member carried by said cylinder and telescopically coacting with said piston to block said flow passage when said piston is in said retracted position and to open said flow passage when said piston is in said advanced position, alignment means serving to maintain radial positioning of said fluid discharge means with respect to said body member, said alignment means comprising a tongue member fixed with respect to said riser portion, said valve member having a hollow interior extending longitudinally thereof to receive said tongue and formed sufficiently enlarged to permit said tongue to be rotated therein, means forming a constriction of said hollow interior to slideably engage said tongue and preclude rotation thereof during projection and retraction of said piston, fluid passage means for passing liquid into and out of said cylinder at opposite ends thereof to move said piston between said retracted and advanced positions to open said flow passage and discharge said liquid therethrough and out said fluid discharge means, said tongue being formed to include a relieved portion disposed to register adjacent said constriction when said riser portion is in its retracted position, said relieved portion including a transversely extending ledge, said relieved portion being dimensioned to clear said constriction and permit rotation between said tongue and said valve member to dispose said ledge beneath said constriction to preclude projection of the piston axially of the valve member.

9. A sprinkler head according to claim 8 further including abutment means within said cylinder and disposed to engage and limit the rotation of said piston with respect to said cylinder when in its retracted position, said abutment means serving to transfer applied torque from said riser portion to said body.

10. A sprinkler head according to claim 8 wherein a sealing ring is carried by said piston around the flow passage therein in sealing relation between said valve member and said piston, means limiting upward movement of the piston to define said advanced position at a point reached prior to carrying said sealing ring upwardly beyond the end of said valve member, and a plurality of grooves extending along the outer surface of the valve member at the upper end thereof, said grooves being disposed to be encircled by said sealing ring intermediate the ends of the grooves when said piston is in said advanced position thereby serving to pass fluid across the sealing ring via said grooves to said fluid discharge means.

References Cited by the Examiner

UNITED STATES PATENTS

| | | | |
|---|---|---|---|
| 39,458 | 8/1863 | Baird | 92—107 |
| 421,150 | 2/1890 | Whittier | 92—107 |
| 481,174 | 8/1892 | Horton | 91—467 |
| 1,484,888 | 2/1924 | Johnson | 239—204 |
| 1,682,624 | 8/1928 | North | 137—625.21 |
| 1,815,395 | 7/1931 | Buckner | 239—206 |
| 1,831,446 | 11/1931 | Hansen | 91—467 |
| 1,869,920 | 9/1932 | Soubier | 239—204 |
| 1,892,959 | 1/1933 | Lippert | 239—206 |
| 1,953,518 | 4/1934 | Sweetland | 239—204 |
| 2,393,091 | 1/1946 | Lacy-Mulhall | 239—66 |
| 2,399,112 | 4/1946 | Glover | 239—205 |
| 2,607,623 | 8/1952 | Lippert | 239—204 |
| 2,793,908 | 5/1957 | Carver | 239—66 |
| 2,939,249 | 6/1960 | Siebenthal | 239—205 X |
| 2,946,348 | 7/1960 | North | 137—625.21 |
| 2,989,246 | 6/1961 | Sloane | 239—204 |
| 3,033,467 | 5/1962 | Hofer | 239—204 |

FOREIGN PATENTS 111,106    1900    Germany.

M. HENSON WOOD, JR., *Primary Examiner.*

EVERETT W. KIRBY, *Examiner.*

D. L. MOSELEY, *Assistant Examiner.*